United States Patent [19]
Takeuchi et al.

[11] Patent Number: 5,639,577
[45] Date of Patent: Jun. 17, 1997

[54] NONAQUEOUS ELECTROCHEMICAL CELL HAVING A MIXED CATHODE AND METHOD OF PREPARATION

[75] Inventors: Esther S. Takeuchi, East Amherst; Randolph A. Leising, Williamsville, both of N.Y.

[73] Assignee: Wilson Greatbatch Ltd., Clarence, N.Y.

[21] Appl. No.: 632,852

[22] Filed: Apr. 16, 1996

[51] Int. Cl.$^6$ .................................. H01M 4/02
[52] U.S. Cl. .................. 429/219; 429/220; 29/623.1
[58] Field of Search .................. 429/194, 218, 429/219, 220, 221, 224, 217, 90, 232, 245; 29/623.1, 623.5; 424/232, 245

[56] References Cited

U.S. PATENT DOCUMENTS

| | | | |
|---|---|---|---|
| 4,041,220 | 8/1977 | Armand | 429/191 |
| 4,310,609 | 1/1982 | Liang et al. | 429/194 |
| 4,316,777 | 2/1982 | Dey | 204/2.1 |
| 4,670,363 | 6/1987 | Whitney et al. | 429/196 |
| 4,707,422 | 11/1987 | de Neufville et al. | 429/48 |
| 5,107,444 | 4/1992 | Nakajima et al. | 429/218 |
| 5,180,642 | 1/1993 | Weiss et al. | 429/90 |
| 5,273,846 | 12/1993 | Plichta et al. | 429/193 |
| 5,435,874 | 7/1995 | Takeuchi et al. | 156/242 |
| 5,443,930 | 8/1995 | Shoji et al. | 424/224 |
| 5,472,810 | 12/1995 | Takeuchi et al. | 429/218 |

OTHER PUBLICATIONS

Handbook Of Batteries And Fuel Cells; David Linden—pp. 2–10, 1984 (no month available).

*Primary Examiner*—M. Nuzzolillo
*Attorney, Agent, or Firm*—Hodgson, Russ, Andrews, Woods & Goodyear LLP

[57] ABSTRACT

A cathode active material admixture comprising a metal, a metal oxide, a mixed metal oxide or a metal sulfide and fluorinated carbon, is described. A preferred admixture comprises copper-silver-vanadium oxide and $CF_x$. Such a blended cathode active admixture is useful in a nonaqueous electrochemical cell discharged for extended periods under a light load interrupted by high rate pulse discharges, such as occurs in an implantable medical device.

55 Claims, 3 Drawing Sheets

FIG. 3

NONAQUEOUS ELECTROCHEMICAL CELL HAVING A MIXED CATHODE AND METHOD OF PREPARATION

BACKGROUND OF THE INVENTION

1. Field of the Invention

The present invention generally relates to the conversion of chemical energy to electrical energy, and more particularly, to an alkali metal electrochemical cell having a positive electrode comprising a cathode active admixture of a metal-containing material combined with fluorinated carbon.

Advantages related to the use of a metal-containing material/fluorinated carbon admixture include increased capacity during high rate discharge applications. An example of such an application is the implantable cardiac defibrillator where the electrochemical cell may discharge under a light load for extended periods of time interrupted by high rate pulse discharge. Utilizing a mixture of a metal-containing material such as a metal, a metal oxide, a mixed metal oxide or a metal sulfide and fluorinated carbon provides a blend of the high power density of the metal material and the high capacity associated with the fluorinated carbon to give a cathode active material admixture displaying enhanced performance exceeding either of the independent materials.

2. Prior Art

The use of a metal-containing material such as a mixed metal oxide containing copper, silver and vanadium ($Cu_xAg_yV_2O_z$, CSVO) has been previously demonstrated for application as a cathode active material in an alkali metal electrochemical cell. For a thorough discussion of the preparation of CSVO, reference is made to U.S. Pat. No. 5,472,810 to Takeuchi et al., which is assigned to the assignee of the present invention and incorporated herein by reference. In addition to having a high energy density, the use of CSVO cathode active material in an alkali metal electrochemical cell provides a high delivered capacity for the intercalation of the alkali metal under high rate applications. Likewise, the use of fluorinated carbon $(CF_x)_n$ has also been previously demonstrated for cathodes in primary lithium batteries (Linden, D. *Handbook of Batteries & Fuel Cells;* McGraw Hill: New York, 1984; p. 11–55). Fluorinated carbon generally is used in low to medium rate applications where high power density is not required.

U.S. Pat. No. 5,180,642 to Weiss et al. discloses electrochemical cells having a cathode mixture comprising carbon monofluoride and a minor amount of an additive such as vanadium oxide and silver vanadate. This patent is directed to the combination of these materials as an end-of-service indication and not to the formulation of a blended cathode material for both light load and high pulse discharge applications.

U.S. Pat. Nos. 5,273,846 to Plichta et al., 4,707,422 to de Neufville et al., 4,316,777 to Dey and 4,670,363 to Whitney relate to combining a metal oxide with a carbonaceous cathode active material; however, they do not discuss the use of such a mixture for both light load discharge and current pulse discharge applications.

SUMMARY OF THE INVENTION

The present invention relates to a cathode active material admixture for a nonaqueous electrochemical cell, the admixture comprising a metal, a metal oxide, a mixed metal oxide or a metal sulfide and fluorinated carbon. The metal-containing material preferably is a mixed metal oxide that preferably contains copper, silver and vanadium, i.e., CSVO, such as $Cu_xAg_yV_2O_z$. Such a blended cathode active admixture provides increased delivered capacity under current pulse discharge conditions in comparison to either 100% CSVO or 100% fluorinated carbon active cathodes. Thus, the CSVO/fluorinated carbon cathode active admixture is particularly useful in an electrochemical cell discharged for extended periods under a light load interrupted by high rate pulse discharge, such as occurs in an implantable cardiac defibrillator.

These and other aspects of the present invention will become more apparent to those skilled in the art by reference to the following description and to the appended drawings.

DETAILED DESCRIPTION OF THE PREFERRED EMBODIMENTS

The electrochemical cell of the present invention comprises an anode of a metal selected from Group IA of the Periodic Table of the Elements, including lithium, sodium, potassium, etc., and their alloys and intermetallic compounds including, for example, Li-Si, Li-Al, Li-B and Li-Si-B alloys and intermetallic compounds. The form of the anode may vary, but typically, it is made as a thin sheet or foil of the anode metal, and a current collector having an extended tab or lead affixed to the anode sheet or foil.

The electrochemical cell of the present invention further comprises a cathode of electronically conductive composite material which serves as the other electrode of the cell. The electrochemical reaction at the cathode involves conversion of ions which migrate from the anode to the cathode into atomic or molecular forms. The composite cathode material of the present invention comprises at least a first cathode active constituent which may be a metal, a metal oxide or a mixed metal oxide comprising at least a first and a second metals, or a mixture of a first and a second metals or their metal oxides incorporated in the matrix of the host metal oxide. The first cathode active constituent may also comprise a metal sulfide.

The metal oxide or the mixed metal oxide of the first cathode active constituent of this invention can be constructed by the chemical addition, reaction, or otherwise intimate contact of various metal oxides and/or metal elements, preferably during thermal treatment, sol-gel formation, chemical vapor deposition or hydrothermal synthesis in mixed states. The materials thereby produced contain metals and oxides of the Groups IB, IIB, IIIB, IVB, VB, VIB, VIIB, and VIII which includes the noble metals and/or other oxide compounds.

According to one method of the present invention, readily decomposable compounds consisting of metals from Groups IB, IIB, IIIB, IVB, VB, VIB, VIIB, as well as similarly decomposable compounds from Group VIII, are thermally treated so as to effect the rapid preparation of the oxides or the respective metal elements themselves to be utilized further in the preparation of suitable cathode materials. Such readily decomposable materials include, but are not limited to, those classes of compounds known as nitrates, nitrites, carbonates, and/or ammonium salts. The precursor material (i.e., nitrates, nitrites, carbonates, ammonium compounds, etc.) may be decomposed in a combined state or individually decomposed and thereafter combined in an oxide/decomposable metal salt compound and subsequently decomposed to form the first cathode active constituent comprising the mixed metal oxide.

Preferred mixed metal oxides are prepared by thermally decomposing a vanadium salt, suitably ammonium metavanadate to produce vanadium pentoxide. A decomposable metal salt, suitably the nitrates of a second metal and a third metal, are then added to the vanadium pentoxide, thoroughly mixed therewith and thereafter ignited. The second and third metals are most preferably silver and copper. The resultant composite cathode includes $V_2O_z$ wherein $z \leq 5$ combined with $Ag_2O_z$ wherein $z=0$ to 1 and $CuO_z$ wherein $z=0$ to 1 to provide the mixed metal oxide having the general formula $Cu_xAg_yV_2O_z$, (CSVO). Thus, the preferred first cathode active constituent may be described as a metal oxide-metal oxide-metal oxide, a metal-metal oxide-metal oxide, or a metal-metal oxide and the range of material composition found for $Cu_xAg_yV_2O_z$ is preferably about $0.01 \leq x \leq 1.0$, about $0.01 \leq y \leq 1.0$ and about $5.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium.

Additional active materials suitable for the first cathode active constituent include silver vanadium oxide, manganese dioxide, cobalt oxide, nickel oxide, copper oxide, titanium disulfide, copper sulfide, iron sulfide, iron disulfide, copper vanadium oxide, and mixtures thereof. More specifically, the preferred first cathode active constituent comprises CSVO, powdered polytetrafluoroethylene (PTFE) binder, and graphite and carbon black conductive diluents.

The cathode active admixture of the present invention further comprises a carbonaceous second cathode active constituent prepared from carbon and fluorine, and include graphitic and nongraphitic forms of carbon, such as coke, charcoal or activated carbon. The fluorinated carbon is represented by the formula $(CF_x)_n$ wherein x varies between about 0.1 to 1.9 and preferably between about 0.5 and 1.2, and $(C_2F)_n$ wherein the n refers to the number of monomer units which can vary widely. The preferred second cathode active constituent comprises $CF_x$ combined with a conductive carbon additive, such as acetylene black and/or graphite; and PTFE.

A preferred cathode active admixture according to the present invention comprises from about 67% to 85%, by weight, of the first cathode active constituent and from about 15% to 33%, by weight, of the fluorinated carbon second cathode active constituent. It should be understood that the first cathode active constituent and the second cathode active constituent can be individually mixed with the powdered fluoro-resin binder and the conductive diluents before themselves being admixed, or the first and second cathode active constituents can be first mixed and then further admixed with the fluoro-resin binder and the conductive diluents. Metallic powders such as nickel, aluminum, titanium and stainless steel in powder form are also useful as conductive diluents when mixed with the cathode active constituents of the present invention.

The blended cathode active admixture may be formed into a free-standing sheet prior to being contacted with a current collector to form the cathode electrode. The manner in which the cathode active admixture is prepared into a free-standing sheet is thoroughly described in U.S. Pat. No. 5,435,874 to Takeuchi et al., which is assigned to the assignee of the present invention and incorporated herein by reference. Further, cathode components for incorporation into the cell may also be prepared by rolling, spreading or pressing the cathode active admixture of the present invention onto a suitable current collector. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the electrochemical cell. Illustrative separator materials include fabrics woven from fluoropolymeric fibers including polyvinylidene fluoride, polyethylenetetrafluoroethylene, and polyethylenechlorotrifluoroethylene either alone or laminated with a fluoropolymeric microporous film, non-woven glass, polypropylene, polyethylene, glass fiber material, ceramics, polytetrafluoroethylene membrane commercially available under the designations ZITEX (Chemplast Inc.), polypropylene membrane, commercially available under the designation CELGARD (Celanese Plastic Company, Inc.) and DEXIGLAS (C. H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate into the cathode active material, and has the general formula $MM'F_6$ wherein M is an alkali metal similar to the alkali metal comprising the anode and M' is an element selected from the group consisting of phosphorous, arsenic and antimony. Examples of salts yielding $M'F_6$ are: hexafluorophosphate ($PF_6$), hexafluoroarsenate ($AsF_6$) and hexafluoroantimonate ($SbF_6$). Alternatively, the corresponding sodium or potassium salts may be used.

Preferably the electrolyte comprises at least one ion-forming alkali metal salt of hexafluorophosphate, hexafluororoarsenate or hexafluoroantimonate dissolved in a suitable organic solvent wherein the ion-forming alkali metal is similar to the alkali metal comprising the anode. Thus, in the case of the anode comprising lithium, the alkali metal salt comprises lithium hexafluorophosphate, lithium hexafluoroarsenate, lithium hexafluoroantimonate dissolved in a suitable solvent mixture. Other inorganic salts useful with the present invention include $LiBF_4$, $LiClO_4$, $LiAlCl_4$, $LiGaCl_4$, $LiC(SO_2CF_3)_3$, $LiN(SO_2CF_3)_2$ and $LiCF_3SO_3$, and mixtures thereof.

Low viscosity solvents include tetrahydrofuran (THF), methyl acetate (MA), diglyme, triglyme, tetraglyme, dimethyl carbonate (DMC), diethyl carbonate, 1,2-dimethoxyethane (DME) and mixtures thereof, and high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-butyrolactone (GBL) and N-methyl-pyrrolidinone (NMP) and mixtures thereof. In the present invention, the anode is lithium metal and the preferred electrolyte is 1.0M to 1.4M $LiAsF_6$ dissolved in an aprotic solvent mixture comprising a 50/50 mixture (by volume) of propylene carbonate (PC) and dimethoxyethane (DME).

The preferred form of the electrochemical cell is a case-negative design wherein the anode/cathode couple is inserted into a conductive metal casing such that the casing is connected to the anode current collector in a case-negative configuration, as is well known to those skilled in the art. A preferred material for the casing is titanium although stainless steel, mild steel, nickel-plated mild steel, and aluminum are also suitable. The casing header comprises a metallic lid having a sufficient number of openings to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

Figure 1:
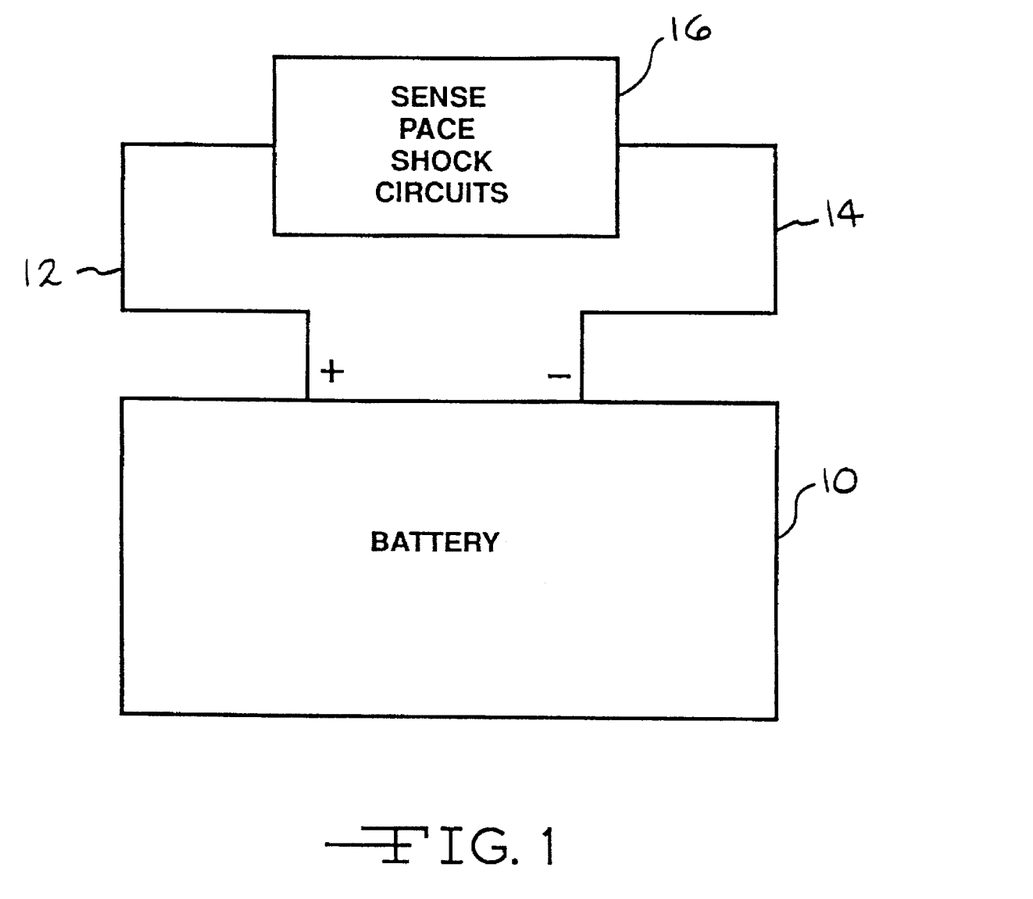
FIG. 1 is a schematic of one possible configuration of a battery 10 according to the present invention adopted for use in powering a cardiac defibrillator.

Referring now to the drawings, FIG. 1 shows a schematic embodiment of a battery 10 constructed according to the present invention having an alkali metal anode operatively associated with a positive electrode comprising a cathode active admixture of a metal-containing material combined with fluorinated carbon. As previously discussed, a preferred form of the cathode active admixture is $CSVO/(CF_x)_N$ which is particularly useful for discharge for extended periods under a light load interrupted by high rate pulse discharge, such as occurs in an implantable cardiac defibrillator. Thus, battery 10 has a positive terminal 12 and a negative terminal 14 connected to a "load" 16 comprising a generally medium rate, constant resistance load component provided by circuits performing such functions as, for example, the heart rate sensing and pacing functions. Load 16 further comprises a generally high rate, pulse discharge load component that occurs, for example, during the charging of a capacitor in a cardiac defibrillator for the purpose of delivering an electrical shock to the heart to treat tachyarrhythmias, the irregular, rapid heartbeats that can be fatal if left uncorrected. The $CSVO/(CF_x)_N$ cathode active admixture is particularly well suited for this type of application with the $(CF_x)_N$ constituent dischargeable under constant rate conditions such as occur in a cardiac defibrillator during the heart rate sensing and pace functions and with the CSVO constituent dischargeable under pulse discharge conditions during the capacitor charging and shock functions provided by the defibrillator.

The following examples describe the manner and process of an electrochemical cell according to the present invention, and they set forth the best mode contemplated by the inventors of carrying out the invention, but they are not to be construed as limiting.

EXAMPLE I

The ability of various $CSVO/CF_x$ cathode admixtures to intercalate lithium was tested in experimental cells filled with a nonaqueous electrolyte. The test cells utilized a cathode active pellet (1.4 cm×3.6 cm×0.06–0.10 cm) consisting of a mixture of a CSVO cathode active material constituent and $CF_x$ cathode material constituent. The CSVO constituent contained, by weight, 94% CSVO, 3% polytetrafluoroethylene, 2% graphite, and 1% carbon black. The $CF_x$ constituent contained, by weight, 91% $CF_x$, 4% polytetrafluoroethylene, and 5% carbon black. These cathode active mixtures were blended together in ratios of 85% to 67% of the CSVO constituent to 15% to 33% of the $CF_x$ constituent and pressed at 31 tons of pressure onto an expanded metal current collector to provide the cathode components. The thusly formed cathodes were incorporated into various electrochemical cells separated from a lithium anode by a polypropylene separator. Lithium metal (1.4 cm×3.6 cm×0.08 cm), also in contact with an expanded metal current collector, was placed against the separator facing the cathode. Both electrodes were surrounded by glass plates and held together by small metal clamps. The various cells were each placed in a glass enclosure and filled with 1M $LiAsF_6$ in PC/DME electrolyte.

EXAMPLE II

Some of the test cells constructed according to Example I were discharged at a constant resistance (200 Ω) down to a voltage of +1.5 V vs $Li/Li^+$. The results of the low rate, constant resistance discharge are presented in Table 1 (unit weight basis) and Table 2 (unit volume basis) which compare the low rate, constant resistance discharge of CSVO relative to $CF_x$. From Tables 1 and 2, it is evident that $CF_x$ provides higher delivered capacity than CSVO when discharged under low-rate conditions.

TABLE 1

Low-Rate Constant Resistance (200 Ω) Discharge

| | Capacity Ah/kg | | |
|---|---|---|---|
| Cathode Material | To +2.0 V | To +1.7 V | To +1.5 V |
| 100 CSVO | 299 | 320 | 327 |
| 85% CSVO/15% $CF_x$ | 370 | 419 | 438 |
| 67% CSVO/33% $CF_x$ | 466 | 546 | 574 |
| 100% $CF_x$ | 812 | 1046 | * |

* 100% $CF_x$ cell was removed from test at the +1.7 V cutoff due to scheduling considerations

TABLE 2

Low-Rate Constant Resistance (200 Ω) Discharge

| | Capacity Ah/L | | |
|---|---|---|---|
| Cathode Material | To +2.0 V | To +1.7 V | To +1.5 V |
| 100 CSVO | 783 | 864 | 885 |
| 85% CSVO/15% $CF_x$ | 822 | 930 | 973 |

TABLE 2-continued

Low-Rate Constant Resistance (200 Ω) Discharge

| | Capacity Ah/L | | |
|---|---|---|---|
| Cathode Material | To +2.0 V | To +1.7 V | To +1.5 V |
| 67% CSVO/33% $CF_x$ | 882 | 1032 | 1085 |
| 100% $CF_x$ | 1075 | 1384 | * |

Figure 2:
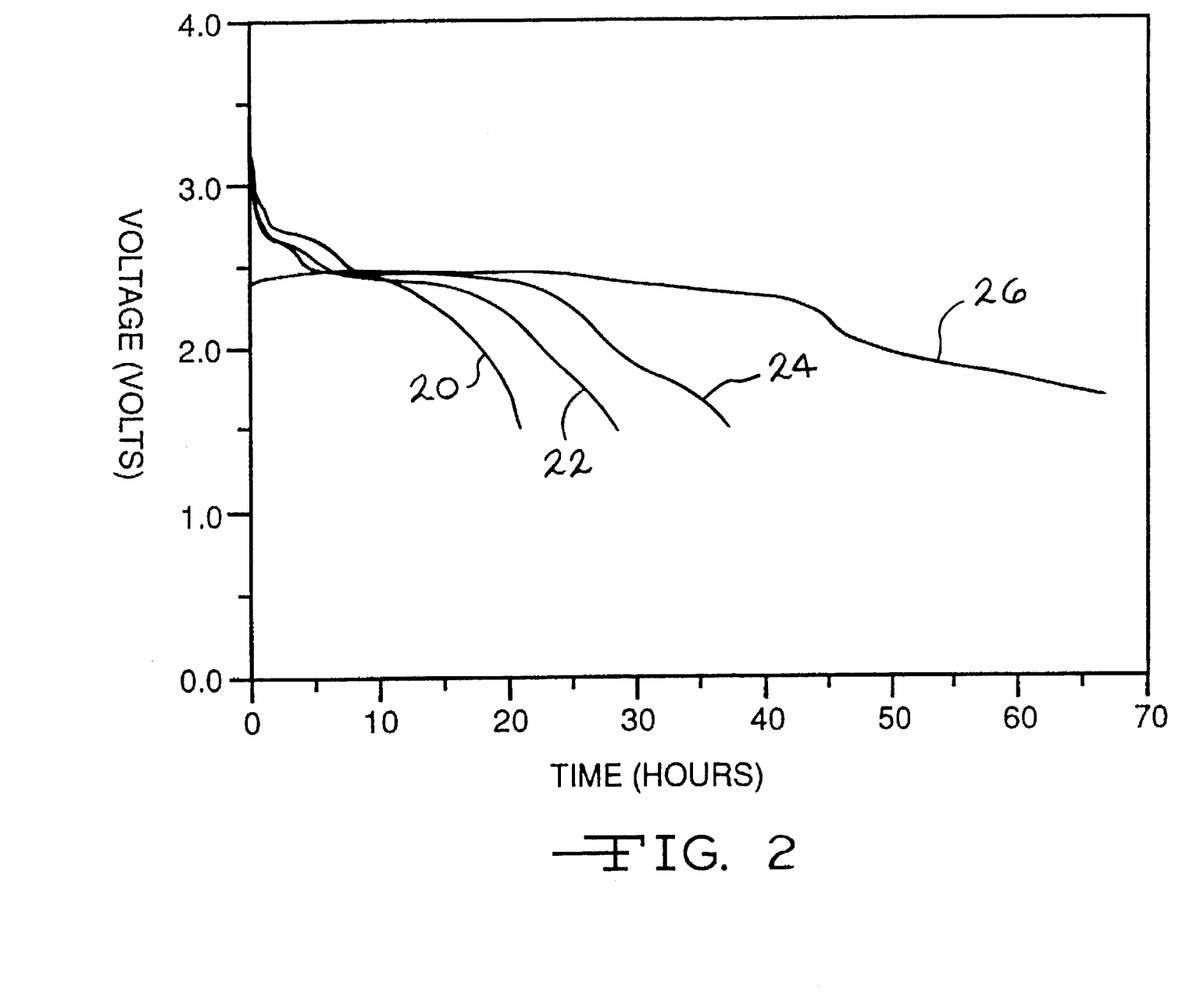
FIG. 2 is a graph showing the discharge voltages versus time for cells having various mixture ratios of CSVO and $(CF_x)_n$ cathode active material constituents.

* 100% $CF_x$ cell was removed from test at the +1.7 V cutoff due to scheduling considerations FIG. 2 is a graph showing the discharge voltage versus time for the various test cells discharged under a constant resistance of 200 Ω to provide the data presented in Tables 1 and 2. In particular, curve 20 was constructed from the discharge of the test cell having the cathode comprising 100% of the CSVO constituent; curve 22 was constructed from the discharge of the test cell having the cathode comprising 85%, by weight, of the CSVO constituent and 15%, by weight, of the $CF_x$ constituent; curve 24 was constructed from the discharge of the test cell having the cathode comprising 67%, by weight, of the CSVO constituent and 33%, by weight, of the $CF_x$ constituent; and curve 26 was constructed from the discharge of the test cell having the cathode comprising 100% of the $CF_x$ constituent.

EXAMPLE III

Some of the test cells fabricated according to Example I and having identical CSVO and $CF_x$ cathode active material constituent ratios as those cells discharged to construct Tables 1 and 2 and FIG. 2 were discharged under high rate pulse discharge tests. In particular, the various test cells were discharged by applying four sequential pulses of constant current 0.19 Amps, each pulse 10 sec. in duration and separated by 15 sec. of open circuit. The current pulses were applied every 30 min. until the minimum pulse voltage reached +1.5 V vs Li/Li⁺. The delivered capacities for the high rate pulse discharge of the test cells are summarized in Table 3 (unit weight basis) and Table 4 (unit volume basis).

TABLE 3

High-Rate Constant Current (0.19 Amp) Pulse Discharge

| | Capacity Ah/kg | | |
|---|---|---|---|
| Cathode Material | To +2.0 V | To +1.7 V | To +1.5 V |
| 100% CSVO | 135.7 | 235.4 | 268.6 |
| 85% CSVO/15% $CF_x$ | 89.5 | 296.5 | 330.1 |
| 67% CSVO/33% $CF_x$ | 13.4 | 417.5 | 457.6 |
| 100% $CF_x$ | 0.0 | 0.0 | 0.0 |

TABLE 4

High-Rate Constant Current (0.19 Amp) Pulse Discharge

| | Capacity Ah/L | | |
|---|---|---|---|
| Cathode Material | To +2.0 V | To +1.7 V | To +1.5 V |
| 100% CSVO | 366.3 | 635.4 | 725.0 |
| 85% CSVO/15% $CF_x$ | 215.8 | 715.0 | 796.0 |
| 67% CSVO/33% $CF_x$ | 29.3 | 912.5 | 1000.1 |
| 100% $CF_x$ | 0.0 | 0.0 | 0.0 |

From Tables 3 and 4, it is apparent that when test cells identical to those cells discharged to construct tables 1 and 2 and FIG. 2 were discharged under high rate pulse conditions, the CSVO cathode active material constituent displayed much higher delivered capacity than the $CF_x$ cathode active material constituent. In fact, the 100% $CF_x$ constituent cell fell below the minimum voltage cutoff during application of the first pulse.

Figure 3:
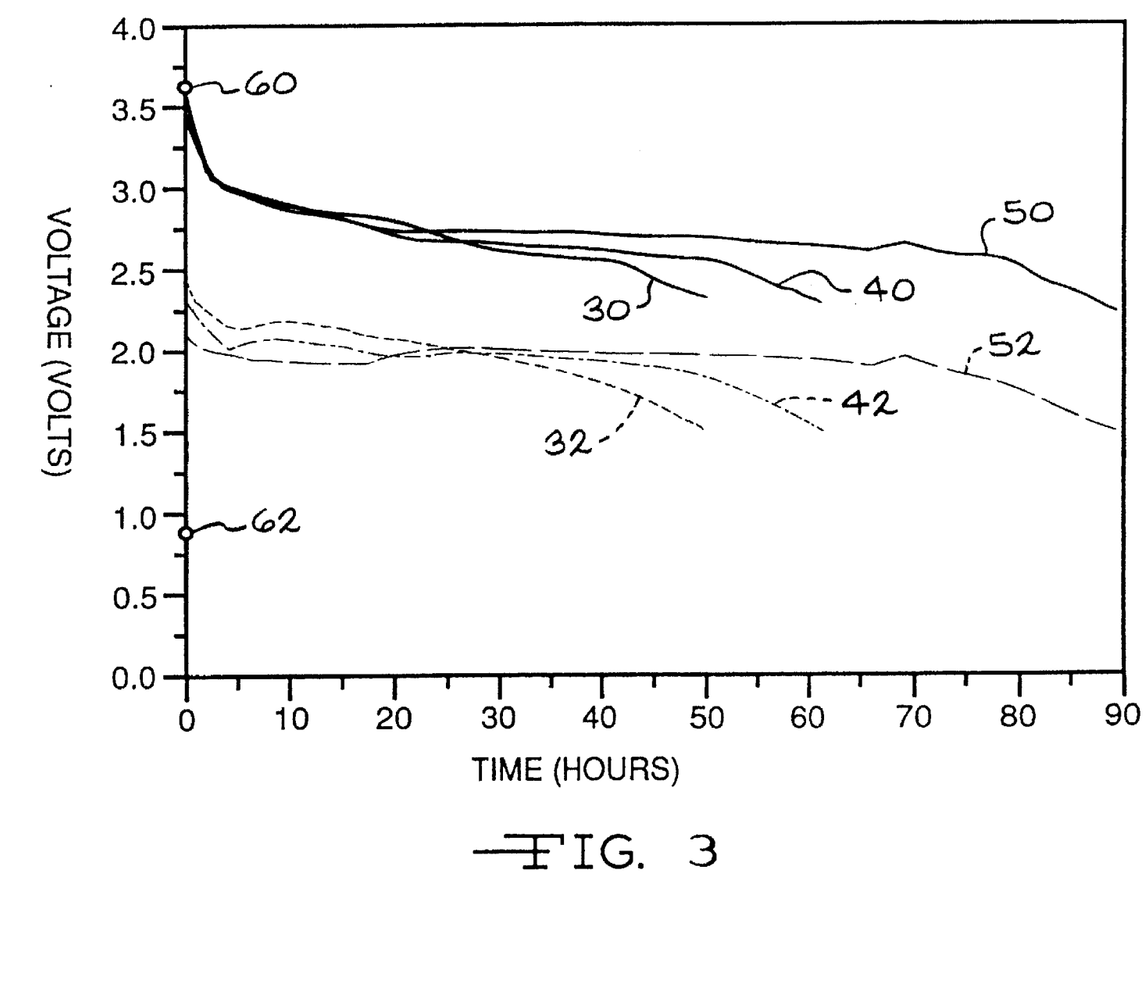
FIG. 3 is a graph showing the pulse discharge versus time for various cells having identical mixture ratios of CSVO and $(CF_x)_n$ cathode active material constituents as the cells discharged to construct the graph shown in FIG. 2.

Discharge curves for this test are displayed in FIG. 3, wherein the pre-pulse open circuit voltages and fourth pulse minimum voltages are plotted for each cell. Specifically, curve 30 was constructed from the open current voltage of the test cell having the cathode comprising 100% of the CSVO constituent and curve 32 was constructed from the fourth pulse minima of this cell; curve 40 was constructed from the open current voltage of the test cell having the cathode comprising 85%, by weight, of the CSVO constituent and 15%, by weight, of the $CF_x$ constituent and curve 42 was constructed from the fourth pulse minima of this cell; curve 50 was constructed from the open current voltage of the test cell having the cathode comprising 67%, by weight, of the CSVO constituent and 33%, by weight, of the $CF_x$ constituent and curve 52 was constructed from the fourth pulse minima of this cell; and point 60 is plotted to indicate the initial open current voltage of the test cell having the cathode comprising 100% of the $CF_x$ constituent while point 62 is plotted to indicate the fourth pulse minima of this cell.

Thus, while $CF_x$ provides higher capacity than CSVO under a low-rate discharge, it cannot be used under conditions of high rate discharge. However, blending CSVO with $CF_x$ cathode active material in a ratio of 85% to 67% CSVO and 15% to 33% $CF_x$ produced the unexpected result of providing a cathode admixture dischargeable for extended periods of time under a low-rate discharge with increased delivered capacity under high rate, current pulse discharge conditions when compared to either 100% CSVO or 100% $CF_x$ cathodes.

It is appreciated that various modifications to the inventive concepts described herein may be apparent to those skilled in the art without departing from the spirit and the scope of the present invention defined by the hereinafter appended claims.

What is claimed is:

1. An electrochemical cell dischargeable under both a substantially constant discharge rate and a current pulse discharge application, which comprises:

a) an anode comprising an alkali metal;

b) a cathode including a cathode mixture of a first cathode active constituent selected from the group consisting of a metal, a metal oxide, a mixed metal oxide and a metal sulfide, and mixtures thereof, wherein the first cathode active constituent is present in the cathode mixture in a first range of about 85% to about 67%, by weight, and wherein the cathode mixture includes fluorinated carbon as a second cathode active constituent present in the cathode mixture in a second range of about 15% to about 33%, by weight; and c) an electrolyte solution operatively associated with the anode and the cathode, wherein the fluorinated carbon provides the cell dischargeable for extended periods of time at the substantially constant discharge rate interrupted by the current pulse application provided by the first cathode active constituent.

2. The electrochemical cell of claim 1 wherein the metal oxide or the mixed metal oxide of the first cathode active constituent is formed as a preparation product of one of the group consisting of a thermal treatment reaction, addition reaction, sol-gel formation, chemical vapor deposition and hydrothermal synthesis of vanadium oxide and at least a second metal.

3. The electrochemical cell of claim 1 wherein the first cathode active constituent of the cathode mixture is selected from the group consisting of silver vanadium oxide, copper-silver-vanadium oxide, manganese dioxide, cobalt oxide, nickel oxide, copper oxide, titanium disulfide, copper sulfide, iron sulfide, copper vanadium oxide, and mixtures thereof.

4. The electrochemical cell of claim 1 wherein the first cathode active constituent is a copper-silver-vanadium oxide having the general formula $Cu_xAg_yV_2O_z$ wherein $0.01 \leq X \leq 1.0$, $0.1 \leq y \leq 1.0$ and $5.01 \leq z \leq 6.5$.

5. The electrochemical cell of claim 4 wherein in the general formula $z \leq y$.

6. The electrochemical cell of claim 1 wherein the metal oxide has a stoichiometric formulation consisting of either $Cu_{0.16}Ag_{0.67}V_2O_z$ with z being about 5.5 or $Cu_{0.5}Ag_{0.5}V_2O_z$ with z being about 5.75.

7. The electrochemical cell of claim 1 wherein the first cathode active constituent and the fluorinated carbon are mixed with at least one of a binder material and a conductive additive.

8. The electrochemical cell of claim 7 wherein the binder material is a fluoro-resin powder.

9. The electrochemical cell of claim 7 wherein the conductive additive is selected from the group consisting of carbon, graphite power, acetylene black and metallic powder selected from the group consisting of titanium, aluminum, nickel and stainless steel, mixtures thereof.

10. The electrochemical cell of claim 7 wherein the cathode mixture comprises up to about 5 weight percent conductive additive and about 1 to 5 weight percent of the binder material.

11. The electrochemical cell of claim 1 where the first cathode active constituent comprises, by weight, about 94% copper-silver-vanadium oxide, about 3% of a fluoro-resin powder, about 2% graphite and about 1% carbon black present in the cathode mixture in the first range of about 85% to about 67%, by weight, and wherein the second cathode active constituent comprises, by weight, about 91% fluorinated carbon, about 4% of a fluoro-resin powder and about 5% carbon black present in the cathode mixture in the second range of about 15% to about 33%, by weight.

12. The electrochemical cell of claim 1 wherein the anode is comprised of lithium.

13. The electrochemical cell of claim 1 wherein the anode comprises a lithium-aluminum alloy.

14. The electrochemical cell of claim 13 wherein aluminum comprises from between about 0% to about 50% by weight of the anode alloy.

15. The electrochemical cell of claim 1 wherein the electrolyte solution operatively associated with the anode and the cathode comprises an ion-forming alkali metal salt dissolved in a nonaqueous solvent, and wherein the alkali metal of the salt is the same as the alkali metal comprising the anode.

16. The electrochemical cell of claim 15 wherein the alkali metal of the anode comprises lithium and the ion-forming alkali metal salt comprising the electrolyte solution is selected from the group consisting of $LiPF_6$, $LiAsF_6$, $LiSbF_6$, $LiBF_4$, $LiClO_4$, $LiAlCl_4$, $LiGaCl_4$ and $LiCF_3SO_3$, and mixtures thereof.

17. The electrochemical cell of claim 15 wherein the nonaqueous solvent comprises at least one organic solvent selected from the group consisting of tetrahydrofuran, propylene carbonate, methyl acetate, acetonitrile, dimethyl sulfoxide, dimethyl formamide, dimethyl acetamide, ethylene carbonate, diglyme, triglyme, tetraglyme, 1,2-dimethoxyethane, dimethyl carbonate, diethyl carbonate, γ-butyrolactone and N-methyl-pyrrolidinone, and mixtures thereof.

18. The electrochemical cell of claim 1 wherein the nonaqueous solvent is an organic solvent that comprises propylene carbonate and dimethoxyethane.

19. The electrochemical cell of claim 18 wherein the propylene carbonate and dimethoxyethane are present in a ratio of about 1:1 by volume.

20. The electrochemical cell of claim 1 wherein the cathode comprises a calendared cathode mixture of the first cathode active constituent and the second cathode active constituent.

21. The electrochemical cell of claim 1 wherein the cathode is formed of a cathode sheet having a thickness in the range of from between about 0.004 inches to about 0.020 inches associated with the anode in a jellyroll configuration.

22. An electrochemical cell dischargeable under both a substantially constant discharge rate and a current pulse discharge application, which comprises:
  a) an anode comprising an alkali metal;
  b) a cathode including a cathode mixture of a mixed metal oxide as a first cathode active constituent present in the cathode mixture in a first range of about 85% to about 67%, by weight, and wherein the cathode mixture includes fluorinated carbon as a second cathode active constituent present in the cathode mixture in a second range of about 15% to about 33%, by weight, wherein the mixed metal oxide comprises vanadium oxide and a mixture of copper and a second metal "SM" selected from the group consisting of Groups IB, IIB, IIIB, IVB, VIB, VIIB, and VIII of the Periodic Table of the Elements, the mixed oxide matrix having the general formula $Cu_xSM_yV_2O_z$ wherein $0.01 \leq x \leq 1.0$, $0.01 \leq y \leq 1.0$ and $5.01 \leq z \leq 6.5$; and
  c) an electrolyte solution operatively associated with the anode and the cathode, wherein the fluorinated carbon provides the cell dischargeable for extended periods of time at the substantially constant discharge rate interrupted by the current pulse application provided by the first cathode active constituent.

23. The electrochemical cell of claim 22 wherein in the general formula $x \leq y$.

24. The electrochemical cell of claim 22 wherein one component of the cathode comprises copper-silver-vanadium oxide as the mixed metal oxide.

25. The electrochemical cell of claim 22 wherein the second metal is a silver compound selected from the group consisting of silver nitrate, silver nitrite, silver carbonate, and salts of silver oxyanions.

26. The electrochemical cell of claim 22 wherein one component of the mixed metal oxide material comprises $V_2O_z$ wherein z is greater than zero but less than or equal to about 5, prepared by the thermal treatment of ammonium vanadate.

27. The electrochemical cell of claim 22 wherein the second metal is a silver compound and one component of the mixed metal oxide material comprises $Ag_2O_z$ wherein z is greater than zero but less than 1, prepared by the thermal treatment of silver nitrate.

28. The electrochemical cell of claim 22 wherein one component of the mixed metal oxide material comprises $CuO_z$ wherein z is greater than zero but less than 1, prepared by the thermal treatment of copper nitrate.

29. The electrochemical cell of claim 22 wherein the second metal is a silver compound and the mixed metal oxide material comprises a mixture of $V_2O_z$ wherein z is greater than zero but less than or equal to about 5, $Ag_2O_z$ wherein z is greater than zero but less than 1 and $Cu_{Oz}$ wherein z is greater than zero but less than 1, prepared by the thermal treatment of vanadium pentoxide, silver nitrate and copper nitrate, respectively.

30. The electrochemical cell of claim 22 wherein the mixed metal oxide material is formed as a preparation product of one of the group selected from a thermal treatment, sol-gel formation, chemical vapor deposition and hydrothermal synthesis of vanadium oxide and the mixture of copper and the second metal.

31. An electrochemical cell, which comprises:
   a) an anode comprising lithium;
   b) a cathode including a cathode mixture of a first cathode active constituent comprising copper-silver-vanadium oxide (CSVO) as a first cathode active constituent and fluorinated carbon as a second cathode active constituent, wherein the first cathode active constituent is present in the cathode mixture in a first range, by weight, of about 85% to about 67% and wherein the fluorinated carbon is present in the cathode mixture in a second range, by weight, of about 15% to about 33%; and
   c) an electrolyte solution operatively associated with the anode and the cathode, wherein the fluorinated carbon provides the cell dischargeable for extended periods of time at the substantially constant discharge rate interrupted by a current pulse application provided by the first cathode active constituent.

32. The electrochemical cell of claim 31 wherein the copper-silver-vanadium oxide has the general formula $Cu_xAg_yV_2O_z$ wherein $0.01 \leq x \leq 1.0$, $0.1 \leq y \leq 1.0$ and $5.01 \leq z \leq 6.5$.

33. The electrochemical cell of claim 31 wherein the CSVO and the fluorinated carbon are mixed with at least one of a binder material and a conductive additive.

34. The electrochemical cell of claim 33 wherein the binder material is a fluoro-resin powder.

35. The electrochemical cell of claim 33 wherein the conductive additive is selected from the group consisting of carbon, graphite power, acetylene black and metallic powder selected from the group consisting of titanium, aluminum, nickel and stainless steel, and mixtures thereof.

36. The electrochemical cell of claim 31 wherein the electrolyte solution operatively associated with the anode and the cathode comprises an ion-forming alkali metal salt dissolved in a nonaqueous solvent, and wherein the alkali metal of the salt is the same as the alkali metal comprising the anode.

37. In combination with an implantable medical device requiring electrical power for both a monitoring function and a device operating function, an electrochemical cell comprising:
   a) an anode comprising an alkali metal;
   b) a cathode including a cathode mixture of a first cathode active constituent selected from the group consisting of a metal, a metal oxide, a mixed metal oxide and a metal sulfide, and mixtures thereof, wherein the first cathode active constituent is present in the cathode mixture in a first range of about 85% to about 67%, by weight, and wherein the cathode mixture includes fluorinated carbon as a second cathode active constituent present in the cathode mixture in a second range of about 15% to about 33% by weight; and
   c) an electrolyte solution operatively associated with the anode and the cathode, wherein the fluorinated carbon provides the cell dischargeable for extended periods of time at a substantially constant discharge rate required for the medical device monitoring function interrupted by a current pulse application required for the medical device operating function provided by the first cathode active constituent.

38. The combination of claim 37 wherein the mixed metal oxide is a copper-silver-vanadium oxides having the general formula $Cu_xAg_yV_2O_z$ and wherein $0.01 \leq x \leq 1.0$, $0.1 \leq y \leq 1.0$ and $5.01 \leq z \leq 6.5$.

39. A cathode for an electrochemical cell, the cathode including a cathode mixture of a mixed metal oxide as a first cathode active constituent present in the cathode mixture in a first range of about 85% to about 67%, by weight, and including fluorinated carbon as a second cathode active constituent present in the cathode mixture in a second range of about 15% to about 33%, by weight, wherein the mixed metal oxide comprises a mixture of vanadium oxide and copper and a second material "SM" selected from the group consisting of Groups IB, IIB, IIB, IVB, VB, VIIB, and VIII of the Periodic Table of the Elements, the mixed metal oxide having the general formula $Cu_xSM_yV_2O_z$ wherein $0.01 \leq x \leq 1.0$, $0.01 \leq y \leq 1.0$ and $5.01 \leq z \leq 6.5$.

40. The cathode of claim 39 wherein in the general formula $x \leq y$.

41. The cathode of claim 39 wherein the second metal is included in a compound selected from the group consisting of metal nitrate, metal nitrite, metal carbonate and ammonium salts of transition metal oxyanions.

42. The cathode of claim 39 wherein one component of the mixed metal oxide comprises $V_2O_z$ wherein z is greater than zero but less than or equal to about 5, prepared by the thermal treatment of ammonium vanadate.

43. The cathode of claim 39 wherein the second metal is a silver compound and one component of the mixed metal oxide comprises $Ag_2O_z$ wherein z is greater than zero but less than 1, prepared by the thermal treatment of silver nitrate.

44. The cathode of claim 39 wherein one component of the mixed metal oxide comprises $CuO_z$ wherein z is greater than zero but less than 1, prepared by the thermal treatment of copper nitrate.

45. The cathode of claim 39 wherein the mixed metal oxide comprises a mixture of $V_2O_z$ wherein z is greater than zero but less than or equal to about 5, $Ag_2O_z$ wherein z is greater than zero but less than 1 and $CuO_z$ wherein z is greater than zero but less than 1, prepared by the thermal treatment of vanadium pentoxide, silver nitrate and copper nitrate, respectively.

46. A method of providing an electrochemical cell capable of discharge at both a substantially constant discharge rate and a current pulse discharge application, which comprises:
   a) providing a casing;
   b) housing an electrochemical cell within the casing, comprising the steps of:
      i) providing an anode comprising an alkali metal;
      ii) providing a cathode, comprising the steps of:
         providing a first cathode active constituent selected from the group consisting of a metal, a metal oxide, a mixed metal oxide and a metal sulfide, and mixtures thereof, wherein the first cathode active constituent is present in a first range of about 85% to about 67%, by weight;
         providing fluorinated carbon as a second cathode active constituent present in a second range of about 15% to about 33%, by weight;
         mixing the first cathode active constituent with the second cathode active constituent to form a cathode active admixture comprising the cathode; and associating the cathode active admixture with a cathode current collector; and iii) positioning the anode and the cathode inside the casing; and c) activating and operatively associating the anode and the cathode with an electrolyte solution filled in the casing, wherein the fluorinated carbon provides the cell dischargeable at the substantially constant discharge rate interrupted by the current pulse application provided by the first cathode active constituent.

47. The method of claim 46 including selecting the first cathode active constituent of the cathode active admixture from the group consisting of silver vanadium oxide, copper-silver-vanadium oxide, manganese dioxide, cobalt oxide, nickel oxide, copper oxide, titanium disulfide, copper sulfide, iron sulfide, iron disulfide, copper vanadium oxide, and mixtures thereof.

48. The method of claim 46 including providing the mixed metal oxide as a copper-silver-vanadium oxide having the general formula $Cu_xAg_yV_2O_z$ wherein $0.01 \leq x \leq 1.0$, $0.1 \leq y \leq 1.0$ and $5.01 \leq z \leq 6.5$.

49. The method of claim 46 including providing the anode comprised of lithium.

50. The method of claim 46 including providing the electrolyte solution operatively associated with the anode and the cathode comprising an ion-forming alkali metal salt dissolved in a nonaqueous solvent, and wherein the alkali metal of the salt is the same as the alkali metal comprising the anode.

51. The method of claim 50 including providing the alkali metal of the anode comprised of lithium and selecting the ion-forming alkali metal salt comprising the electrolyte solution from the group consisting of $LiPF_6$, $LiAsF_6$, $LiSbF_6$, $LiBF_4$, $LiClO_4$, $LiAlCl_4$, $LiGaCl_4$, $Li(SO_2CF_3)_3$, $LiN(SO_2CF_3)_2$ and $LiCF_3SO_3$, and mixtures thereof.

52. The method of claim 50 including providing the nonaqueous organic solvent comprising an organic solvent selected from the group consisting of tetrahydrofuran, propylene carbonate, dimethyl carbonate, diethyl carbonate, methyl acetate, acetonitrile, dimethyl sulfoxide, dimethyl formamide, dimethyl acetamide, γ-butyrolactone, N-methyl-pyrrolidinone, ethylene carbonate, diglyme, triglyme, tetraglyme, 1,2-dimethoxyethane and mixtures thereof.

53. A method of providing an electrochemical cell capable of discharge at both a substantially constant discharge rate and a current pulse discharge application, which comprises:

a) providing a casing;

b) housing an electrochemical cell within the casing, comprising the steps of:

i) providing an anode comprising an alkali metal;

ii) providing a cathode, comprising the steps of:

providing a first cathode active constituent selected from the group consisting of a metal, a metal oxide, a mixed metal oxide and a metal sulfide, and mixtures thereof, wherein the first cathode active constituent is present in a quantity to provide the cell dischargeable under the current pulse discharge application;

providing fluorinated carbon as a second cathode active constituent present in a quantity to provide the cell dischargeable for extended periods of time at the substantially constant discharge rate;

mixing the first cathode active constituent with the second cathode active constituent to form a cathode active admixture comprising the cathode; and operatively associating the cathode active admixture with a cathode current collector; and iii) positioning the anode and the cathode inside the casing; and c) activating the anode and the cathode with an electrolyte solution filled in the casing.

54. The method of claim 53 including selecting the first cathode active constituent of the cathode active admixture from the group consisting of silver vanadium oxide, copper-silver-vanadium oxide, manganese dioxide, cobalt oxide, nickel oxide, copper oxide, titanium disulfide, copper sulfide, iron sulfide, iron disulfide, copper vanadium oxide, and mixtures thereof.

55. The method of claim 53 including providing the electrolyte solution operatively associated with the anode and the cathode comprising an ion-forming alkali metal salt dissolved in a nonaqueous solvent, and wherein the alkali metal of the salt is the same as the alkali metal comprising the anode.

* * * * *